July 10, 1934.  O. C. SUMNER  1,966,022
RESERVE FUEL AND ACCESSORY TRUNK
Filed Feb. 27, 1933  2 Sheets-Sheet 1

Inventor

Oris C. Sumner

By Clarence A O'Brien
Attorney

July 10, 1934.   O. C. SUMNER   1,966,022
RESERVE FUEL AND ACCESSORY TRUNK
Filed Feb. 27, 1933   2 Sheets-Sheet 2

Inventor
Oris C. Sumner
By Clarence A. O'Brien
Attorney

Patented July 10, 1934

1,966,022

UNITED STATES PATENT OFFICE 1,966,022

RESERVE FUEL AND ACCESSORY TRUNK

Oris C. Sumner, Oilmont, Mont., assignor of one-half to Dorothy Himle and Edmund Himle, both of Kevin, Mont.

Application February 27, 1933, Serial No. 658,861

1 Claim. (Cl. 220—20)

As implied by the title, this invention relates to automotive equipment, and has more particular reference to an especially adapted trunk for automobiles applicable to the rear end of the car in the customary manner, but explicitly constructed to function as a reserve tank for extra gasoline as well as a container for tools and analogous needy articles.

In carrying the principles of the inventive conception into actual practice, I have developed a simple and economical trunk substantially identical in appearance with present day types of automobile trunks but primary usuable as a supplemental or reserve tank for gasoline.

The purpose of the invention is to provide facilities and accommodations for fuel and tools, whereby to permit a tourist to carry an extra supply of fuel for reserve purposes in case the main supply is unexpectedly exhausted or the primary tank incapacitated by destruction or injury.

The adoption and use of a structure of the character herein shown and described constitutes a revelation in this particular line of endeavor and affords the requisite result of endurance, and otherwise fulfills the requirements of a structure of this classification.

In the drawings:—

Figure 1:
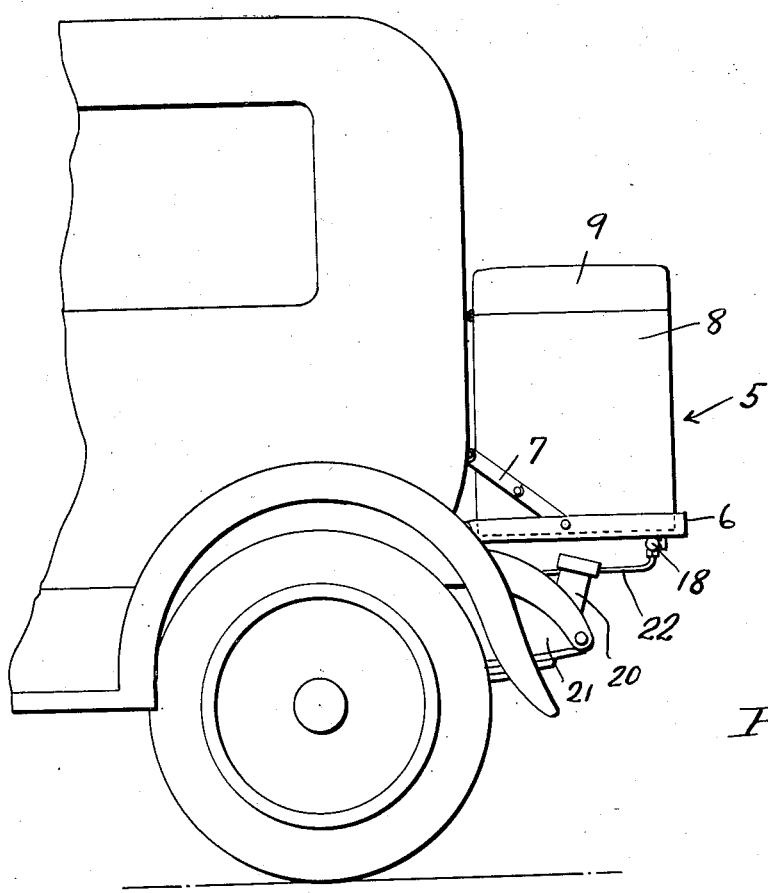
Figure 1 is an elevational view of the rear end portion of a conventional automobile equipped with an invention constructed in accordance with my idea.
Figure 3:
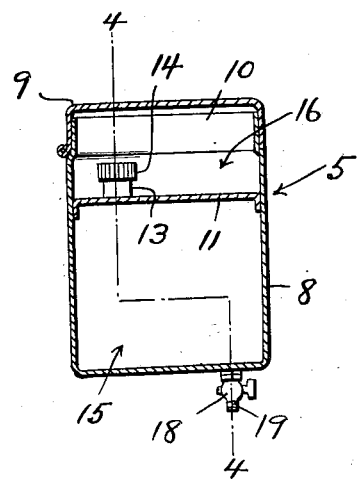
Figure 3 is a transverse vertical section taken approximately on the plane of the line 3—3 of Figure 2.
Figure 2:
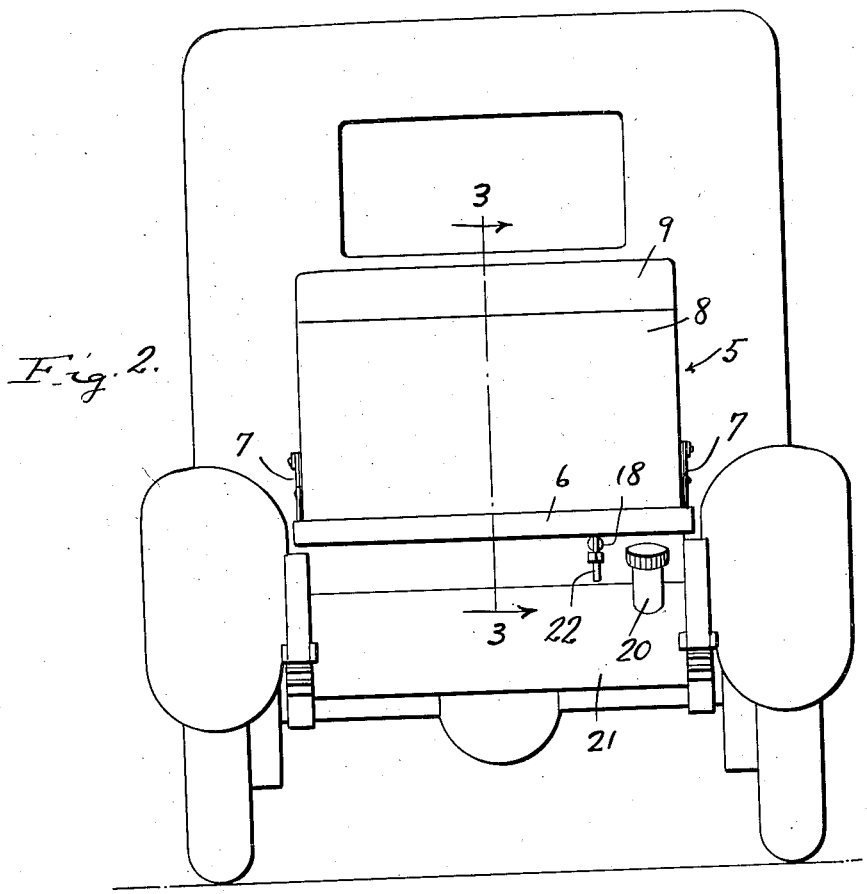
Figure 2 is a rear end elevation of Figure 1, that is, observing it in a direction from right to left.
Figure 4:
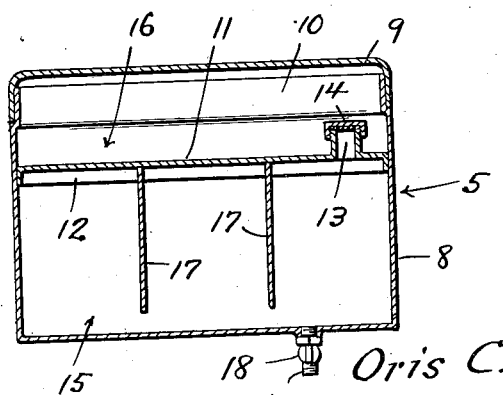
Figure 4 is a section taken on the plane of irregular line 4—4 of Figure 3.

Referred to as a unit, the trunk is distinguished by the numeral 5 and is of appropriate proportions and shape and it may be built on the vehicle as a permanent part thereof or simply utilized as an attachment in the manner illustrated in the drawings. In accordance with the latter idea, the trunk is appropriately mounted in a suitable rack 6 having supporting linkage 7. As before indicated, the trunk is substantially identical in appearance with trunks now generally utilized for accommodation of baggage or luggage. As shown in Figures 3 and 4, the body or box-like portion is generally distinguished by the numeral 8 and its open top is closed by a suitable cover 9 hinged or otherwise fastened in place. The cover preferably telescopes down over the snug fitting rim 10. On the interior of the trunk and located at an appropriate elevation is a horizontal divider or partition 11 having a marginal flange 12 secured to the interior of the wall of the trunk in a liquid-tight manner. At one end this partition is formed with a filler neck 13 having a removable closing cap 14. Manifestly, the partition defines a lower relatively large gasoline or fuel storage compartment 15 and an upper accessory and tool accommodation tray or container 16. The numeral 17 designates baffles attached to and depending from the partition and hanging down in the fuel compartment and terminating in close spaced relation to the bottom thereof. These function as splash plates to balance the load and to overcome undue impact and impetus, such as might otherwise tend to dislodge the trunk from the rack. The numeral 18 designates an appropriately constructed discharge cock or valve having an attaching neck 19. In practice it is possible that a hose could be temporarily attached to this neck and connected with the main filler pipe 20 on the primary tank 21, as shown in Figures 1 and 2, or a pipe line 22 may be permanently attached to the valve and carried into the carbureter so as to permit the gasoline to be transferred directly from the trunk into the carbureter if emergency conditions require it. Thus in accordance with my ideas, the extra fuel can be delivered directly from the trunk to the tank 21 or to the carbureter (not shown) according to the demand of the trade.

The gist of the invention is in the provision of a trunk for the rear end of an automobile, which trunk may be designed to add to the general artistic appearance of the car while at the same time affording means for carrying extra fuel, tools, supplies and analogous accessories. The preferred embodiment of the invention comprises a trunk of the type illustrated in the drawings divided by a partition 12 into upper and lower compartments 15 and 16, wherein the lower compartment serves to accommodate the gas and the other compartment the tools. Incidentally I have used the expression "trunk" to describe the device as a whole due to the fact that it resembles an ordinary trunk. It is understood, however, that the expression "reserve tank" more specifically defines the nature of the container.

Additional novelty is predicated on the use of the partition 11 carrying the anti-splash plates 17, the filler neck and cap 13 and 14 and the valve 18 which may be directly connected with the carbureter or temporarily connected by a hose with the main tank 21.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

A reserve fuel and accessory trunk comprising a trunk proper provided with a horizontal partition spaced downwardly from the top of said trunk and dividing the trunk into a lower fuel compartment and an upper accessory compartment, said partition being provided with a filling neck for the introduction of fuel into said fuel compartment, a discharge valve for said fuel compartment mounted on the bottom wall of said trunk, and a hose connected with said valve for directing fuel from said compartment either directly to the usual fuel tank or the carbureter of an automobile, optionally.

ORIS C. SUMNER.